United States Patent
Takanishi et al.

[11] Patent Number: 5,719,468
[45] Date of Patent: Feb. 17, 1998

[54] INCANDESCENT LAMP

[75] Inventors: Hiroyoshi Takanishi; Kazunari Fukue; Tsutomu Watanabe; Hiroshi Kamata; Akira Kawakatsu, all of Kanagawa-ken, Japan

[73] Assignee: Toshiba Lighting Technology Corporation, Tokyo, Japan

[21] Appl. No.: 623,830

[22] Filed: Mar. 29, 1996

[30] Foreign Application Priority Data

Mar. 31, 1995 [JP] Japan .................................. 7-075153
Sep. 28, 1995 [JP] Japan .................................. 7-250761

[51] Int. Cl.$^6$ .................................................. H01K 1/32
[52] U.S. Cl. ........................ 313/578; 313/579; 313/580; 313/635; 313/112
[58] Field of Search .................................. 313/578, 579, 313/580, 634, 635, 112, 113, 493

[56] References Cited

U.S. PATENT DOCUMENTS

| | | |
|---|---|---|
| 4,492,893 | 1/1985 | Steiner et al. .................. 313/579 X |
| 5,017,825 | 5/1991 | Heijnen et al. .................. 313/580 X |
| 5,548,182 | 8/1996 | Bunk et al. .................... 313/580 X |

FOREIGN PATENT DOCUMENTS

| | | | |
|---|---|---|---|
| 6283146 | 10/1994 | Japan | 313/579 |
| 6290760 | 10/1994 | Japan | 313/579 |
| 6290761 | 10/1994 | Japan | 313/578 |

*Primary Examiner*—Sandra L. O'Shea
*Assistant Examiner*—Ashok Patel
*Attorney, Agent, or Firm*—Cushman, Darby & Cushman IP Group of Pillsbury Madison & Sutro LLP

[57] ABSTRACT

An incandescent lamp has an envelope including a cylindrical portion and two hemispherical portions. Each hemispherical portion includes a second order curve which has a focus and is connected at one end of the cylindrical portion, respectively. A filament is provided along the central axis of the envelope and is located within and extends beyond a space surrounded by the cylindrical portion. An optical interference layer is arranged on a surface of the envelope to reflect infrared rays and transmit visible rays.

37 Claims, 4 Drawing Sheets

| TEST LAMPS | TEMPERATURE. OF FILAMENT (K) | | | | | | | | | MAX.TEMP. DIFFERENCE | RELATIVE EFFICIENCY |
|---|---|---|---|---|---|---|---|---|---|---|---|
| | 2ND | 4TH | 6TH | 8TH | 10TH | 12TH | 14TH | 16TH | 18TH | | |
| A | 2510 | 2570 | 2570 | 2650 | 2690 | 2580 | 2550 | 2550 | 2500 | 180 K | 130% |
| B | 2640 | 2650 | 2800 | 2840 | 2725 | 2770 | 2730 | 2730 | 2550 | 175 K | 130% |
| C | 2370 | 2500 | 2560 | 2540 | 2500 | 2520 | 2500 | 2460 | 2320 | 180 K | 100% |
| D | 2425 | 2600 | 2600 | 2620 | 2630 | 2560 | 2580 | 2500 | 2300 | 330 K | 130% |
| E | 2530 | 2520 | 2500 | 2510 | 2570 | 2550 | 2560 | 2520 | 2340 | 230 K | 120% |

INCANDESCENT LAMP

BACKGROUND OF THE INVENTION

1. Field of the Invention

The present invention relates to incandescent lamps. In particular, the invention relates to an incandescent lamp having an optical interference layer arranged on a surface thereof.

2. Description of the Related Art

A recently developed incandescent lamp is filled with a halogen gas and includes an infrared ray reflecting film formed on the surface of the envelope. Of the light emitted by the filament, infrared rays are reflected by the reflecting film back to the filament, while visible light is transmitted. The returning infrared rays heat the filament to increase the efficiency of the incandescent lamp. At the same time, the amount of infrared rays emitted outside of the incandescent lamp is reduced. The percentage of infrared rays returning to the filament, which is known as the geometric gain factor, should be high to maximize the emitting efficiency of the incandescent lamp. However, when the geometric gain factor becomes high, the temperature of the filament of the incandescent lamp tends to lack uniformity, because infrared rays reflected back to the filament tend to concentrate on a single portion of the filament. As a result, that portion of the filament evaporates more quickly than the remainder of the filament, so that the filament burns out early.

Various attempts have been made to cause the infrared rays to be reflected back uniformly along the filament. Japanese Laid Open Patent Application No. 55-117861 discloses an incandescent lamp having a spheroid envelope. The filament is disposed between the foci of the spheroid envelope so that the filament length is more than half of the length between the foci and less than the length.

Japanese Laid Open Patent Application No. 63-16548 discloses an incandescent lamp having an envelope composed of a cylindrical portion and two hemisphere portions. Each hemisphere portion is provided at one end of the cylindrical portion, respectively. The filament is symmetrically disposed between the foci of the hemisphere portions.

According to these applications, the reflected infrared rays are not concentrated on a fixed portion of the filament. However, these solutions are not enough to achieve uniform filament temperature, because the filament is generally supported by lead wires at its ends. Therefore, the temperature of the filament near its ends drops as compared to the temperature at its center due to heat conduction through the lead wires. Accordingly, even though the reflected infrared rays may be more uniform, the temperature at the center of the filament becomes higher. Further, in the latter incandescent lamp, as the cylindrical portion has a long length compared with the filament length, it is difficult to improve the geometric gain factor and the lamp efficiency.

SUMMARY OF THE INVENTION

Accordingly, the invention has as a primary object the provision of an incandescent lamp that enables the uniformity of the filament temperature to improve without decreasing the lamp efficiency.

According to this invention, an incandescent lamp includes an envelope having a wall including a cylindrical portion and two hemispherical portions. Each hemispherical portion includes a curve of second order which has a focus, and is provided at one end of the cylindrical portion, respectively. A filament is provided along the central axis of the envelope. The filament is located within and extends beyond a space surrounded by the cylindrical portion. An optical interference layer is arranged on a surface of the wall.

These and other aspects of the invention are further described in the following drawings and detailed description of the invention.

BRIEF DESCRIPTION OF THE DRAWINGS

The present invention will now be described in more detail by way of examples illustrated by drawings in which.

DETAILED DESCRIPTION OF THE PRESENTLY PREFERRED EXEMPLARY EMBODIMENTS

Referring now to FIGS. 1 to 5, a first embodiment of this invention will be explained.

Figure 1:
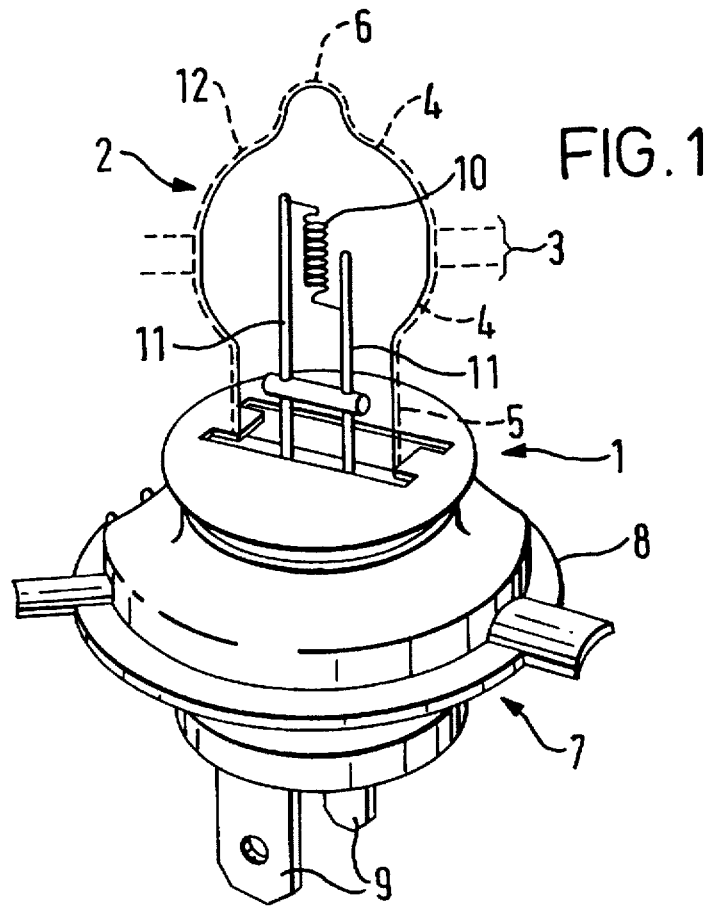
FIG. 1 is a perspective view of an incandescent lamp according to a first embodiment of the present invention.
Figure 2:
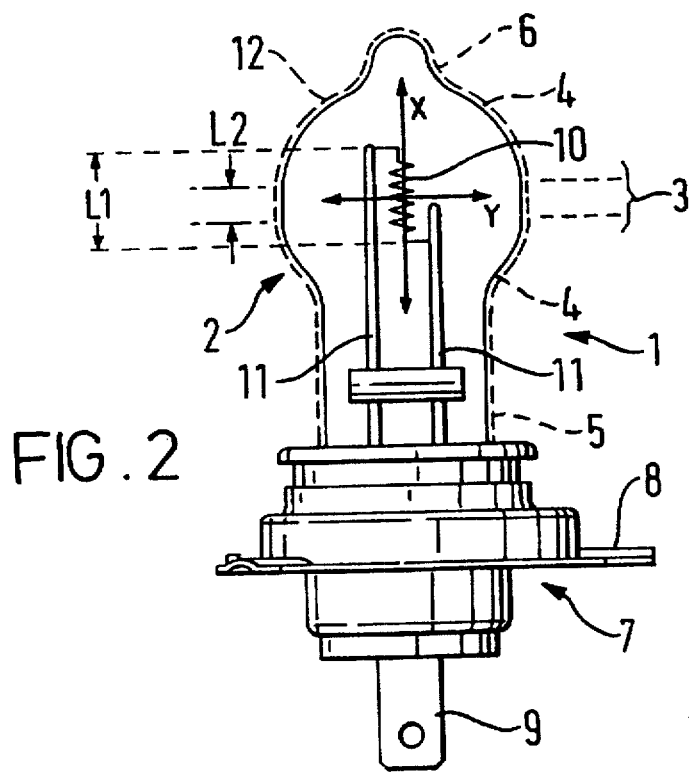
FIG. 2 is a side elevation view of the incandescent lamp shown in FIG. 1.

FIG. 1 shows an incandescent lamp 1. An envelope 2 of incandescent lamp i is continuously formed with a cylindrical portion 3, two curved portions 4 and neck portion 5. The overall length of envelope 2 is about 50 mm. Envelope 2 also includes an exhaust tube 6 which is used for pumping air from envelope 2 and refilling envelope 2 with a mixture of an inert gas and a halogen gas. Cylindrical portion 3 has a diameter of about 16 mm and a length of about 2.5 mm. Each curved portion 4 has a configuration formed by a revolution round the minor axis of a hemiellipse, whose major axis X and a minor axis Y are 9 mm and 8 mm, respectively. Each curved portion 4 has a focus within a space surrounded by itself. Alternatively, other configurations formed by a second degree curved surface can be used to form curved portion 4, such as a true hemisphere or any other configuration. In other words, any curved surface having a focus, which is formed by a revolution of a second degree curve around an axis, can be provided at each end of cylindrical portion 3.

A sealed portion (not shown) is also formed at an end of envelope 2 opposite thin tube 6, where envelope 2 is attached a base 7. In this embodiment, base 7 has a flange 8 and terminals 9 so that lamp 1 can be applied as a headlight for an automobile. A filament 10 is provided along the central axis of envelope 2 in a space surrounded by cylindrical portion 3, so as to span lead wires 11 passed through the sealed portion. Filament 10 has a length of 5.35 mm and an outer diameter of 1.3 mm. Filament 10 is formed of a single coiled wire made of tungsten having a diameter of 0.18 mm. It has a coiling pitch of 146% and includes 20 turns. Lead wires 11 are connected with terminals 9, respectively.

An optical interference layer 12, indicated by a dotted line, is arranged on an external wall of envelope 2. Optical interference layer 12 includes a plurality of high refractive index layers made of a metal oxide substance, preferably titanium oxide ($TiO_2$), tantalum oxide ($Ta_2O_5$), zirconium oxide ($ZrO_2$) or zinc sulfide (ZnS), alternated with a plurality of low refractive index layers made of a metal oxide substance, preferably silicon oxide ($SiO_2$) or magnesium fluoride ($MgF_2$). The high refractive index layers and the low refractive index layers are alternately stacked on each other for a total of 9 to 50 layers. In this embodiment, thirty-three (33) layers are used. Optical interference layer 12 transmits visible light and reflects infrared rays as a result of light interference.

Figures 3, 5:
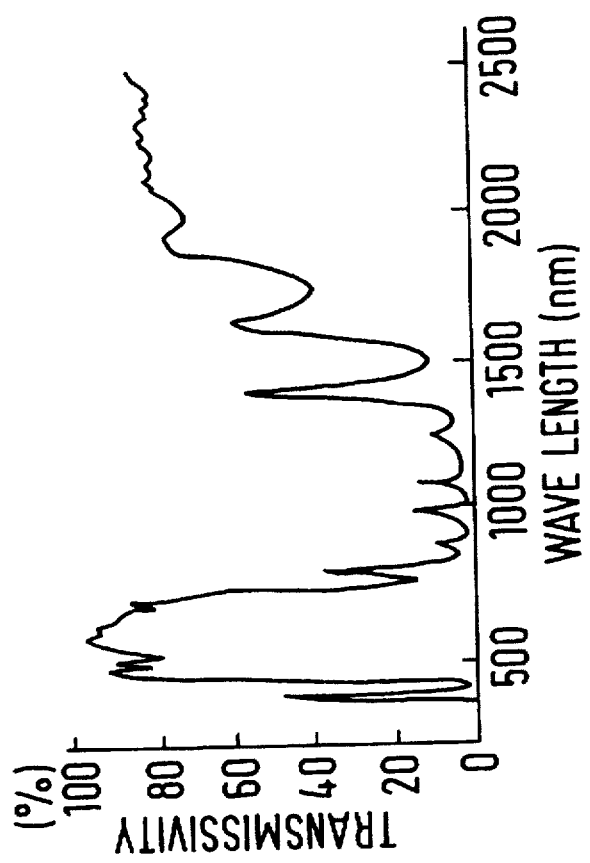
FIG. 3 is a spectral transmittance distribution of an optical interference layer used in the first embodiment of the present invention.
FIG. 5 is a table showing filament temperature distributions of test lamps.

FIG. 3 shows a spectral transmittance distribution of optical interference layer 12. As shown in FIG. 3, although optical interference layer 12 transmits visible light within 400 nm to 800 nm, it reflects infrared rays within 800 nm to near 1500 nm. Accordingly, infrared rays incident on envelope 2 are reflected by optical interference layer 12. Although the infrared rays incident to each curved portion 4 are reflected and concentrated at the focus of the particular curved portion 4, the infrared rays incident on cylindrical portion 3 are reflected without concentration.

Figure 4:
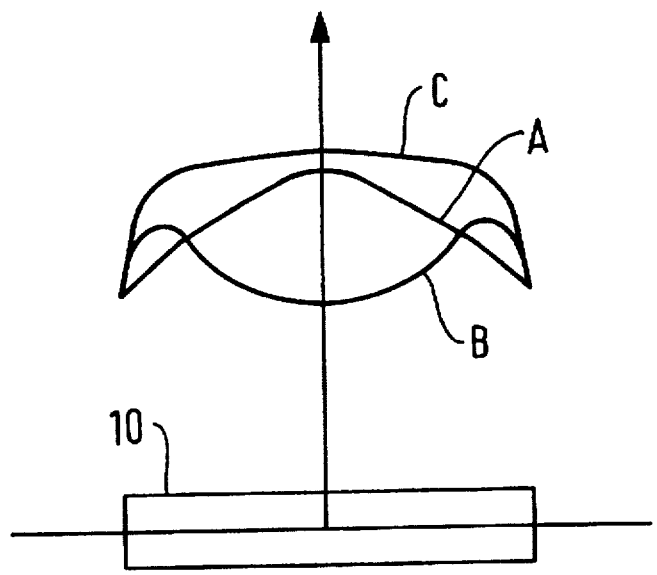
FIG. 4 is a infrared energy distribution diagram of the incandescent lamp shown in FIG. 1.

FIG. 4 shows an infrared ray energy distribution diagram along filament 10 when incandescent lamp 1 operates. In FIG. 4, the curve (A) indicates infrared energy generated by filament 10, (B) indicates infrared energy reflected onto filament 10 and (C) indicates the total infrared energy affecting filament 10. According to FIG. 4, the intensity of infrared rays generated by filament 10 drops near the ends of filament 10, because heat is conducted through lead wires 11. However, the intensity of reflected infrared rays gradually increases toward the ends of filament 10, because the infrared rays incident on each curved portion 4 are reflected towards the focus which is close to each end of filament 10. Infrared rays, incident on cylindrical portion 3 at the center of filament 10, are returned to filament 10 without concentration. As a result, the ends of filament 10 are properly heated by the reflected infrared rays. Therefore, as indicated by curve (C), the actual total infrared energy distribution is uniform along filament 10.

The length (L2) of cylindrical portion 3 is preferably selected to be between ¼ and ½ of filament length L1. When the length of the cylindrical portion L2 is less than ¼ of L1, the foci of the filament length curved portions 4 are close together, so that reflected infrared rays are concentrated at one portion of filament 10. When the length of the cylindrical portion L2 is more than ½ of the filament length L1, the geometric gain factor becomes lower, and the temperature of filament 10 falls at its ends. Furthermore, when each curved portion 4 has a hemiellipsoidal configuration like the present embodiment, the filament length L1 is preferably selected between $4 \times (X-Y) \leq L1 \leq 6 \times (X-Y)$, wherein X and Y are the major axis and the minor axis of the hemiellipsoid, respectively. When the filament length L1 is shorter than this range, the ends of filament 10 get close to the center of filament 10, and the temperature of the center of filament 10 rises excessively. While the filament length L1 is longer than this range, the lamp efficiency decreases because the temperature at the ends of filament 10 drops.

FIG. 5 shows experimental results of five test lamps. The test lamp A is incandescent lamp 1 of the present embodiment. The test lamp B is made identically except for the length, (L2) of cylindrical portion 3 that is 5.35 mm (the same as the length of the filament), which is included within the scope of the present invention. The envelopes of test lamps C to E have configurations corresponded to that of prior art lamps. Test lamp C has a cylindrical envelope of 12 mm outer diameter. The test lamp D has a spherical envelope of 16 mm outer diameter. Test lamp E has an ellipsoidal envelope having a minor axis of 16 mm and major axis of 24 mm. All test lamps have the same coiled filament of twenty turns as explained above and are made identically except as described. FIG. 5 indicates temperatures at various points along each filament (at the second turn to the eighteenth turn). FIG. 5 also shows the maximum temperature difference between various points of each filament, and the relative efficiency of each incandescent lamp where the base efficiency is test lamp C.

As shown in FIG. 5, test lamps A to C have smaller temperature differences than the others. However, the efficiency of test lamp C is lower than the others. Therefore, only test lamps A and B achieve uniformity in filament temperature and good lamp efficiency.

When the lamp is rated at 24 volts or less, it is difficult to keep the temperature along the filament uniform, because its filament has a short length. However, the present invention can improve the uniformity of the filament temperature in such a low voltage lamp. Similarly, when the filament is formed of a single coiled wire, as its heat capacity is small, the filament temperatures at its ends are more likely to fall due to heat conduction through the lead wires. Therefore, it is preferable to apply the present invention to a lamp having a single coiled filament.

Figure 6:
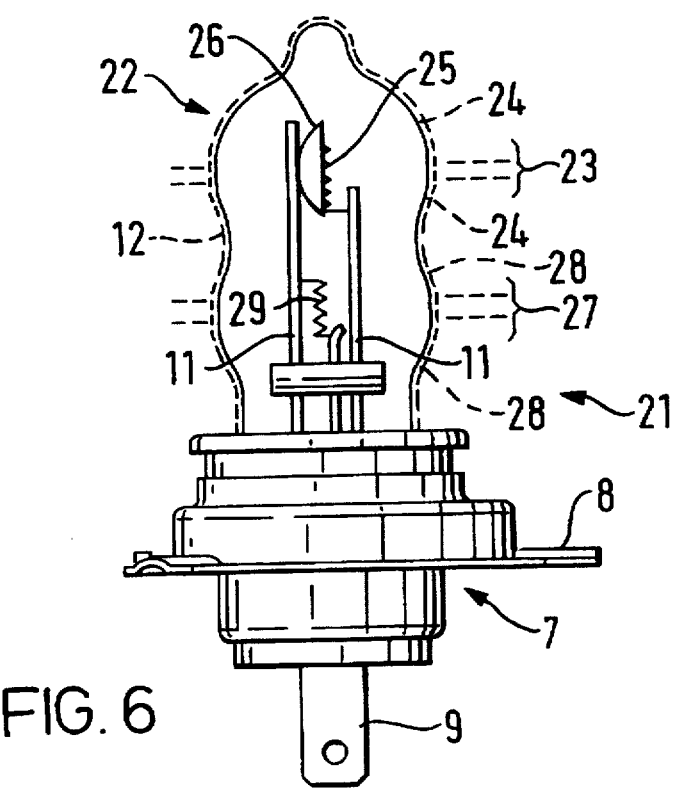
FIG. 6 is a side elevation view of an incandescent lamp according to a second embodiment of the present invention.
Figure 7:
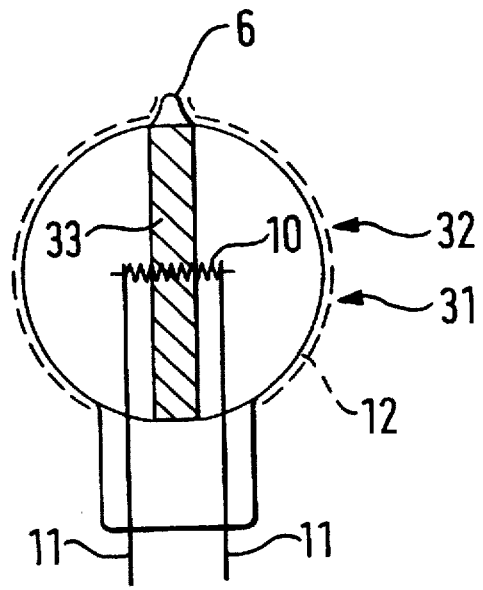
FIG. 7 is a schematic illustration of an incandescent lamp according to a third embodiment of the present invention.
Figure 8:
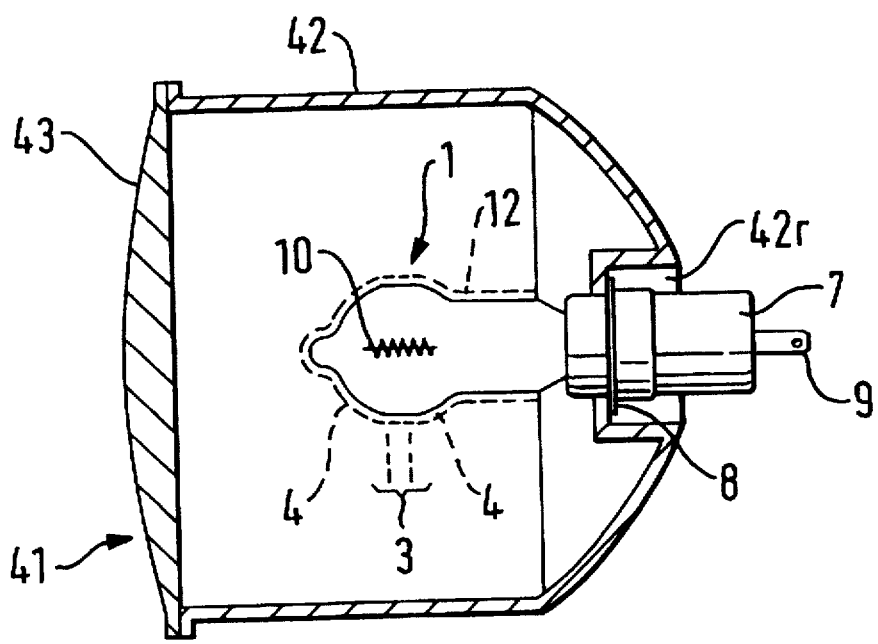
FIG. 8 is a sectional view of a headlight apparatus according to an embodiment of the present invention.

Other embodiments in accordance with the present invention are shown in FIGS. 6 to 8. Like reference characters designate identical or corresponding elements of the above disclosed first embodiment. The construction and operation of the following embodiments are substantially the same as the first embodiment and, therefore, detailed explanations of their operations are not provided.

FIG. 6 shows a twin filament incandescent lamp 21 according to a second embodiment of the present invention, which is suitable for a headlight of an automobile.

An envelope 22 of incandescent lamp 21 has first wall and second wall which continues from one end of the first wall. The first wall is formed by a cylindrical portion 23 and two curved portions 24 as in the first embodiment. First filament 25 is provided along the axis of envelope 22 in a first space surrounded by cylindrical portion 23 of the first wall. In order to produce a sharp cut-off with no light shining on the other side of the road, a parabolic shield 26 is attached to one of lead wires 11 so as to oppose first filament 25. This eliminates glare for an oncoming driver and intensifies the beam onto the curb to produce adequate visibility when passing other vehicles. Therefore, first filament 25 operates as the low beam source. Similarly, the second wall is formed by a cylindrical portion 27 and two curved portions 28. Second filament 29 is provided within a second space surrounded by the second wall along the axis of envelope 22. Second filament 29 produces the high beam. According to this embodiment, first filament 25 producing the low beam does not burn out early because first filament 25 has a uniform temperature distribution. As the low beam is frequently used in general, it is preferable to apply the present invention to the filament producing the low beam. However, the present invention is not only useful for first filament 25 but also for the other filament.

FIG. 7 shows an incandescent lamp 31 according to a third embodiment of the present invention. As shown in FIG. 7, although the shape of an envelope 32 is almost spherical, it has a cylindrical portion 33 indicated by parallel oblique lines.

FIG. 8 shows a headlight apparatus 41 according to an embodiment of the invention, which uses incandescent lamp 1 of the first embodiment. Headlight apparatus 41 is assembled with incandescent lamp 1, a reflector 42 and a lens 43. Incandescent lamp 1 is fitted on reflector 42 by fastening a flange 8 of its base 7 to a rear edge 42r of reflector 42. Reflector 42 has an aluminized reflection film coated on its inner surface. Lens 43 is fixed on the front edge of reflector 42 by an epoxy resin glue, and transmits light reflected by reflector 42. According to the present embodiment, when incandescent lamp 1 is energized, filament 10 heats up to a high temperature to generate light including infrared rays and visible light. When the light generated by filament 10 reaches optical interference layer 12 through envelope 2, optical interference layer 12 transmits visible light and reflects infrared rays. The infrared rays incident on each curved portion 4 are concentrated toward each focus of hemispherical portion 4 which is close to each end of filament 10. The infrared rays incident on cylindrical portion 3, corresponding to a center of filament 10, are returned to filament 10 without concentration. As a result, the ends of filament 10 are properly heated by the reflected infrared rays. Therefore, the total infrared energy distribution is uniform along filament 10. As a result, the filament temperature of incandescent lamp 1 is more uniform without decreasing luminous efficiency. The visible light transmitted through optical interference layer 12 is reflected by reflector 42, and thus, radiates toward the outside of headlight apparatus 41 through lens 43.

While the invention has been described in connection with what are presently considered to be the most practical and preferred embodiments, it is to be understood that the invention is not limited to the disclosed embodiments. On the contrary, this invention is intended to cover various modifications and equivalent arrangements included within the spirit and scope of the appended claims.

What is claimed is:

1. An incandescent lamp comprising:

an envelope having a wall including a cylindrical portion and two curved portions, each curved portion including a second order curve which has a focus and being connected at one end of said cylindrical portion, respectively;

a filament provided along a central axis of said envelope, said filament being located within and extending beyond a space surrounded by said cylindrical portion; and an optical interference layer arranged on a surface of said wall.

2. An incandescent lamp according to claim 1, wherein said envelope is filled with a halogen gas.

3. An incandescent lamp according to claim 1, wherein said filament has a length L1 satisfying the relation of L1/4≦L2≦L1/2 when L2 is the length of said cylindrical portion along said central axis.

4. An incandescent lamp according to claim 1, wherein each curved portion is a hemiellipsoid.

5. An incandescent lamp according to claim 1, wherein each focus is positioned near one end of said filament, respectively.

6. An incandescent lamp according to claim 4, wherein said filament has a length L1 satisfied the relation of 4×(X-Y)≦L1≦6×(X-Y) when lengths of a major axis and a minor axis of each said hemiellipsoid are X and Y, respectively and said major axis is located on said central axis.

7. An incandescent lamp according to claim 1, wherein said filament is formed of a single coiled wire.

8. An incandescent lamp according to claim 1, wherein said lamp has a rated operating voltage of 24 volts or less.

9. An incandescent lamp according to claim 1, wherein each curved portion is a hemisphere.

10. An incandescent lamp comprising:

an envelope having a first wall and a second wall, said first wall including a first cylindrical portion and two first curved portions, each first curved portion including a second order curve which has a focus and being connected at one end of said first cylindrical portion, respectively, said second wall being connected at one end of said first wall;

a first filament provided along the central axis of said envelope, said first filament being located within and extending beyond a first space surrounded by said cylindrical portion;

a second filament provided within a second space surrounded by said second wall; and an optical interference layer arranged at least on a surface of said first wall.

11. An incandescent lamp according to claim 10, wherein said envelope is filled with a halogen gas.

12. An incandescent lamp according to claim 10, wherein said first filament is formed of a single coiled wire.

13. An incandescent lamp according to claim 10, wherein said lamp has a rated operating voltage of 24 volts or less.

14. An incandescent lamp according to claim 10, further comprising a shield provided near one of said filaments.

15. An incandescent lamp according to claim 10, wherein:

said second wall includes a second cylindrical portion and two second curved portions, each second curved portion including a second order curve having a focus and being connected at one end of said second cylindrical portion, respectively; and said second filament is provided along said central axis and is located with and extends beyond a second space surrounded by said second cylindrical portion.

16. An incandescent lamp according to claim 9, wherein each curved portion is a hemisphere.

17. An incandescent lamp according to claim 9, wherein each curved portion is a hemiellipsoid.

18. A headlight apparatus comprising:

an incandescent lamp including:

an envelope having a wall including a cylindrical portion and two curved portions, each curved portion including a second order curve which has a focus and being connected at one end of said cylindrical portion, respectively, a filament provided along a central axis of said envelope, said filament being located within and extending beyond a space surrounded by said cylindrical portion, and an optical interference layer arranged on a surface of said wall;

a reflector housing said incandescent lamp for reflecting light radiated from said incandescent lamp; and a lens disposed at a front end of said reflector for receiving and transmitting said light.

19. A headlight apparatus according to claim 18, wherein said envelope is filled with a halogen gas.

20. A headlight apparatus according to claim 18, wherein said filament of said incandescent lamp has a length L1 satisfied the relation of L1/4≦L2≦L1/2 when L2 is the length of said cylindrical portion along said central axis.

21. A headlight apparatus according to claim 18, wherein each said curved portion is a hemiellipsoid and said filament has a length L1 satisfied the relation of $4\times(X-Y) \leq L1 \leq 6\times(X-Y)$ when lengths of a major axis and a minor axis of each said hemiellipsoid are X and Y, respectively and said major axis is located on said central axis.

22. An incandescent lamp according to claim 15, wherein each curved portion is a hemisphere.

23. An incandescent lamp according to claim 15, wherein each curved portion is a hemiellipsoid.

24. A headlight apparatus comprising:

an incandescent lamp including:

an envelope having a first wall and a second wall, said first wall including a first cylindrical portion and two first curved portions, each first curved portion including a second order curve which has a focus and is connected at one end of said first cylindrical portion, respectively, said second wall being connected at one end of said first wall, a first filament provided along the central axis of said envelope, said first filament being located within and extending beyond a first space surrounded by said cylindrical portion, a second filament provided within said a second space surrounded by said second wall, and an optical interference layer arranged at least on a surface of said first wall;

a reflector housing said incandescent lamp for reflecting light radiated from said incandescent lamp; and a lens disposed at a front end of said reflector for receiving and transmitting said light.

25. A headlight apparatus according to claim 24, wherein said envelope is filled with halogen gas.

26. A headlight apparatus according to claim 24, wherein said incandescent lamp further includes a shield provided near one of said filaments.

27. An incandescent lamp according to claim 24, wherein:

said second wall includes a second cylindrical portion and two second curved portions, each second curved portion including a second order curve having a focus and being connected at one end of said second cylindrical portion, respectively; and said second filament is provided along said central axis and is located with and extends beyond a second space surrounded by said second cylindrical portion.

28. An incandescent lamp according to claim 19, wherein each curved portion is a hemisphere.

29. An incandescent lamp comprising:

an envelope having a wall including a cylindrical portion and a curved portion, the curved portion including a second order curve which has a focus and being connected at one end of said cylindrical portion;

a filament provided along a central axis of said envelope, said filament being located within and extending beyond a space surrounded by said cylindrical portion; and an optical interference layer arranged on a surface of said wall.

30. An incandescent lamp according to claim 29, wherein said envelope is filled with a halogen gas.

31. An incandescent lamp according to claim 29, wherein said filament has a length L1 satisfying the relation of $L1/4 \leq L2 \leq L1/2$ when L2 is the length of said cylindrical portion along said central axis.

32. An incandescent lamp according to claim 29, wherein the curved portion is a hemiellipsoid.

33. An incandescent lamp according to claim 29, wherein the focus is positioned near one end of said filament.

34. An incandescent lamp according to claim 32, wherein said filament has a length L1 satisfied the relation of $4\times(X-Y) \leq L1 \leq 6\times(X-Y)$ when lengths of a major axis and a minor axis of said hemiellipsoid are X and Y, respectively and said major axis is located on said central axis.

35. An incandescent lamp according to claim 29, wherein said filament is formed of a single coiled wire.

36. An incandescent lamp according to claim 29, wherein said lamp has a related operating voltage of 24 volts or less.

37. An incandescent lamp according to claim 29, wherein the curved portion is a hemisphere.

\* \* \* \* \*